United States Patent [19]
Schwab et al.

[11] Patent Number: 5,924,825
[45] Date of Patent: Jul. 20, 1999

[54] THREAD CUTTING INSERT

[75] Inventors: Francis M. Schwab, Metamora; Theodore D. Steidinger, Cropsey, both of Ill.

[73] Assignee: Caterpillar Inc., Peoria, Ill.

[21] Appl. No.: 09/110,645

[22] Filed: Jul. 6, 1998

[51] Int. Cl.$^6$ ...................................................... B26D 1/12

[52] U.S. Cl. .............................. 407/42; 407/24; 407/29; 407/43; 407/48; 407/113

[58] Field of Search ................................. 407/20, 21, 24, 407/25, 26, 29, 42, 43, 48, 33, 34, 35, 113, 114; 82/1.11; 470/198, 199

[56] References Cited

U.S. PATENT DOCUMENTS

| | | |
|---|---|---|
| 1,734,681 | 11/1929 | Lapham . |
| 2,438,744 | 3/1948 | Flynn .......................................... 81/10 |
| 2,855,970 | 10/1958 | Neuschotz ................................. 151/23 |
| 3,371,402 | 3/1968 | Neuschotz ............................. 29/243.52 |
| 3,388,621 | 6/1968 | Neuschotz ..................................... 81/3 |
| 3,394,448 | 7/1968 | Neuschotz et al. ........................ 29/200 |
| 3,574,911 | 4/1971 | Penoyar .................................... 407/114 |
| 3,798,749 | 3/1974 | Duer ............................................ 29/520 |
| 4,409,868 | 10/1983 | Huddle et al. ........................... 82/1.11 |
| 4,610,186 | 9/1986 | Schmidt ................................. 76/101 R |
| 4,669,141 | 6/1987 | Baglin ....................................... 10/86 A |
| 4,913,604 | 4/1990 | Zaengerle ................................. 407/113 |
| 4,936,719 | 6/1990 | Peters ........................................ 407/42 |
| 5,059,069 | 10/1991 | Lagerberg ................................ 407/113 |
| 5,088,861 | 2/1992 | Little ......................................... 407/48 |
| 5,098,232 | 3/1992 | Benson ..................................... 407/24 |
| 5,230,590 | 7/1993 | Bohannan et al. ...................... 407/113 |
| 5,325,748 | 7/1994 | Ehrenberg ................................ 407/29 |
| 5,639,189 | 6/1997 | Hoefler ................................... 407/113 |
| 5,660,507 | 8/1997 | Paya ........................................ 407/114 |

*Primary Examiner*—Andrea L. Pitts
*Assistant Examiner*—Toan Le
*Attorney, Agent, or Firm*—Alan J. Hickman

[57] ABSTRACT

This invention relates generally to a thread cutting insert and more particularly to a thread cutting insert comprising a base and a threading portion. The threading portion has a first thread removal portion and a second thread removal portion for minimizing lead-in and exiting threads, and a cutting portion for cutting a plurality of internal threads. The principle use is for applications that have fluid communicated through the workpiece, such as a fuel injector.

15 Claims, 2 Drawing Sheets

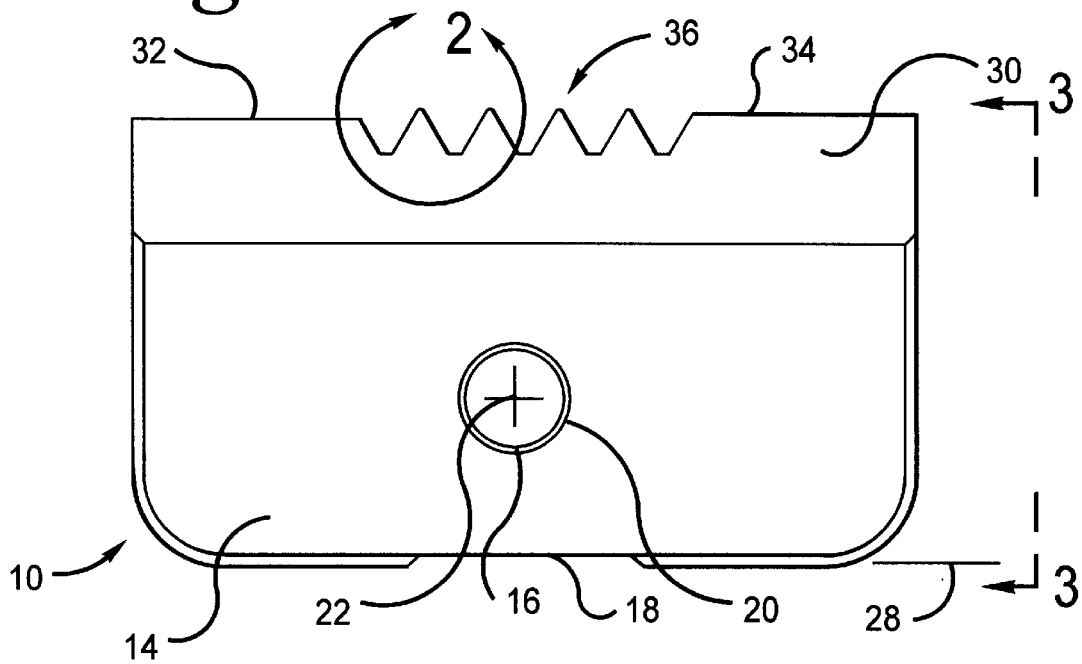
Fig. - 1 -
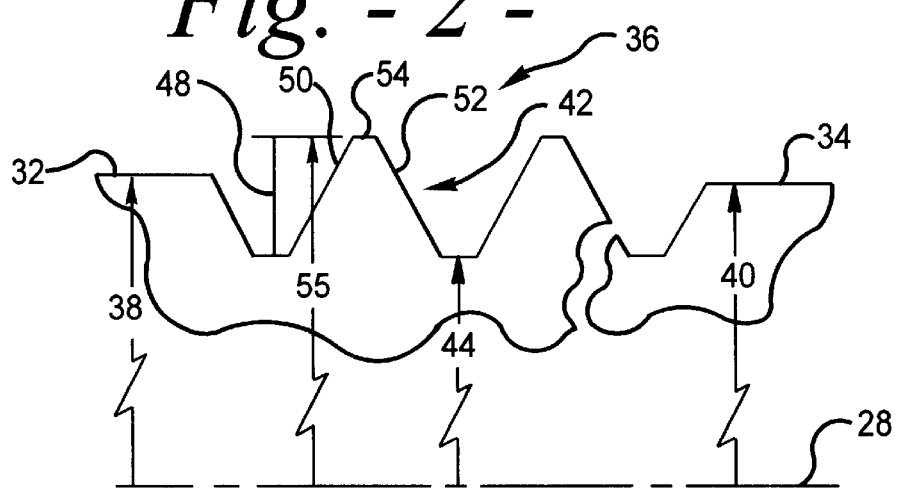
Fig. - 2 -
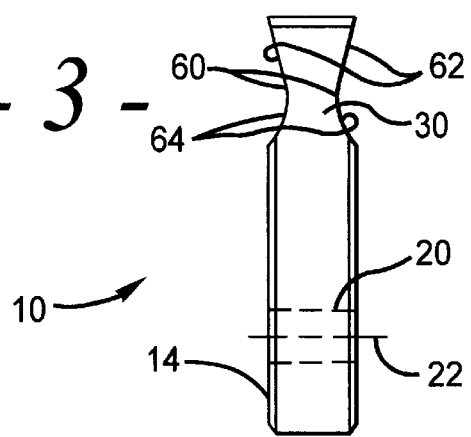
Fig. - 3 -

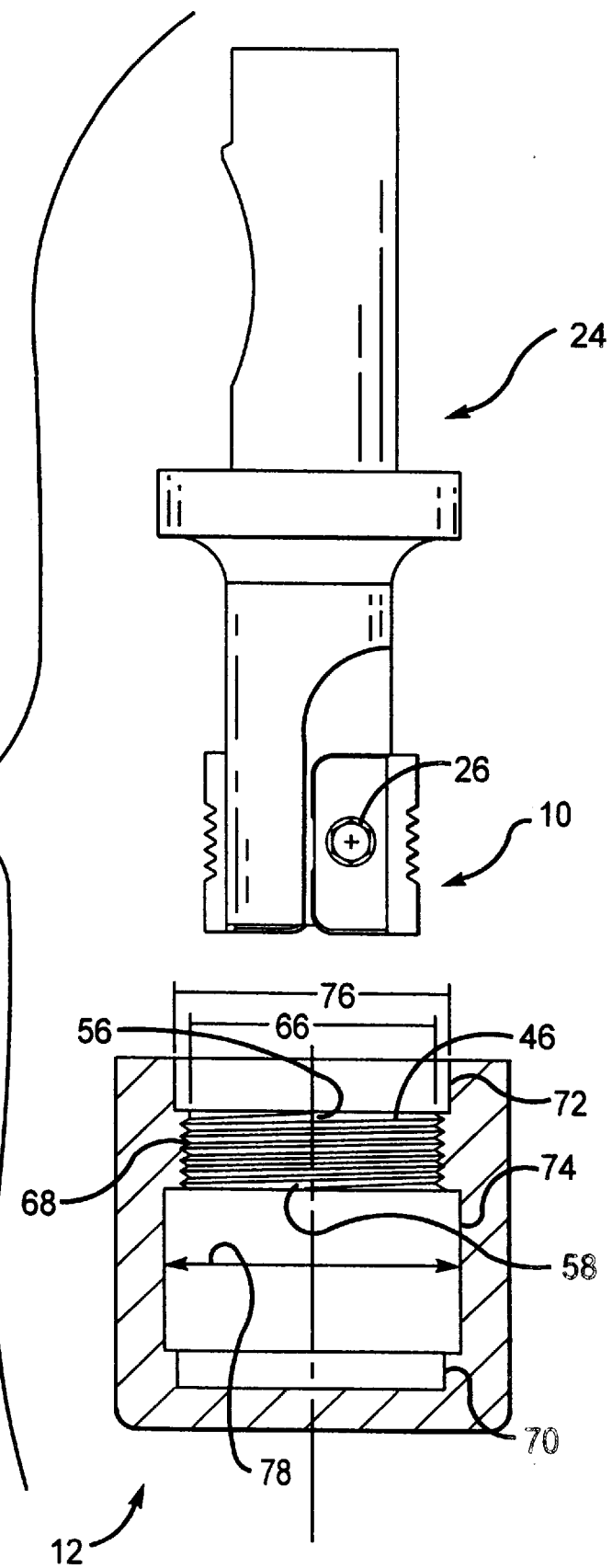
Fig. - 4 -

5,924,825

THREAD CUTTING INSERT

TECHNICAL FIELD

This invention relates generally to a thread cutting insert and more particularly to a thread cutting insert having a thread removal portion.

BACKGROUND ART

It has been found difficult to machine internal or external threads into a workpiece without requiring a lead-in or exiting thread. As typical in the art, thread cutting of a workpiece is accomplished by a turning operation, in which the feeding per revolution of a cutting insert ordinarily corresponds to a thread pitch. The pointed end of the insert is usually cut to a profile intended to correspond to, for example, the space between the threads. The turning operation of feeding the insert through the workpiece produces lead-in and exiting threads. These lead-in an exiting threads are characteristically less in thickness and height than the threads used for securing the workpiece. Ordinarily, the workpiece is then heat treated to provide threads suitable for the amount of tightening force that is required to keep the threaded joint securely fastened. It is critically important to have all the threads heat treated to provide stability to the threaded joint. One potential source of damage occurs when the corresponding workpiece to be secured is over tightened when screwed together. This could cause the lead-in and exiting thread to chip or completely brake away from the workpiece. An application where this may be damaging is, for example, a fuel injector where the lead-in and exiting threads chip off and work their way through the injector down to a nozzle tip thereby blocking a fuel injection orifice. The blocked fuel injection orifice leads to improper injection of fuel thereby providing a less efficient combustion process in an internal combustion engine.

The present invention is directed to overcoming one or more of the problems as set forth above.

DISCLOSURE OF THE INVENTION

A thread cutting insert for connection to a insert holder which comprises a base. The base has a fastener receiving bore defined by a cylindrical surface and a longitudinal axis, and the base has an edge defining a plane. A threading portion has a first thread removal portion, a second thread removal portion, and a cutting portion which is located intermediate the first and second thread removal portions separating said first and second thread removal portions. The cutting portion has a plurality of teeth each having a leading cutting surface spaced a first predetermined distance from the plane, a first cutting surface, and a second cutting surface. The leading cutting surface of each of the plurality of teeth being generally parallel to each other and the first and second cutting surfaces being inclined upwardly and having opposing slopes.

A method of milling threads in a workpiece having a workpiece receiving bore. The workpiece receiving bore is defined by an undercut portion, a counterbore portion, and an internal thread portion located intermediate the counterbore and undercut portions. A thread cutting insert being adapted for use with the workpiece. The thread cutting insert has a threading portion, a first thread removal portion for eliminating a lead-in thread, and a second thread removal portion for eliminating an exiting thread. A cutting portion having a plurality of teeth for cutting a plurality of internal threads. The method comprising the steps of machining the workpiece receiving bore to a first diameter corresponding to the internal thread portion. Machining the undercut portion in the workpiece receiving bore to a second diameter being greater than said first diameter of the workpiece receiving bore. Machining the counterbored portion in the workpiece receiving bore to a third diameter being greater than the first diameter of the workpiece receiving bore. Indexing the thread cutting insert adjacent the internal thread portion of the workpiece receiving bore. Rotating the thread cutting insert at a predetermined speed. Moving the thread cutting insert into engagement with the internal thread portion to a predetermined distance and engaging the first thread removal and cutting portions with the internal thread portion. Moving the thread cutting insert axially continuing engagement of the cutting portion and engaging the second thread removal portion with the internal thread portion thereby minimizing the lead-in and exiting threads. Moving the thread cutting insert radially out of engagement with the internal thread portion of the workpiece receiving bore, the cutting portion having the plurality of teeth clearing the plurality of internal threads of the internal thread portion.

BRIEF DESCRIPTION OF THE DRAWINGS

FIG. 1 is a diagrammatic front plan view of a thread cutting insert embodying the present invention;

FIG. 2 is a diagrammatic exploded partial view of a portion of the thread cutting insert of FIG. 1 embodying the present invention;

FIG. 3 is a diagrammatic side view of the thread cutting insert of FIG. 1 embodying the present invention; and FIG. 4 is a diagrammatic exploded partial cross-sectional view of a portion of a workpiece with a fixture used for holding the thread cutting insert embodying the present invention.

BEST MODE FOR CARRYING OUT THE INVENTION

Referring to FIG. 1, a front plan view of a thread cutting insert 10 used to cut threads into a workpiece 12 as shown in FIG. 4 is shown with one embodiment of the present invention. In this embodiment a base 14 is shown having a fastener receiving bore 16 and an edge 18. The fastener receiving bore 16 is defined by a cylindrical surface 20 and a longitudinal axis 22 as shown in FIG. 3 and is engaged with an insert holder 24. One option for engaging the thread cutting insert 10 with the insert holder 24 is a screw 26 as shown in FIG. 4. The edge 18 of the base 14 defines a plane 28 which is used for determining distances which will be discussed later in detail. A threading portion 30 of the thread cutting insert 10 has a first thread removal portion 32, a second thread removal portion 34, and a cutting portion 36 located intermediate the first and second thread removal portions 32, 34. The first thread removal portion 32 has a first thread removal distance 38 and the second thread removal portion 34 has a second thread removal distance 40 from the plane.

Referring to FIG. 2, the cutting portion 36 has a plurality of teeth 42 and each of the plurality of teeth 42 has a tooth depth 44 measured from the plane 28 defined by the edge 18 of the base 14. The plurality of teeth 42 are evenly spaced apart one from another. Other applications may require the plurality of teeth 42 to be spaced at different increments depending on the application. For example, a second workpiece with external threads (not shown) may require spacing between the external threads to be reduced from one to another. Having different spacing between external threads will require spacing for a plurality of internal threads 46 to become smaller from one to another. Each tooth depth 44 is equal allowing a thread depth 48 being uniform. The plurality of teeth 42 have a first cutting surface 50, a second cutting surface 52, and a leading cutting surface 54 located intermediate the first and second cutting surfaces 50, 52. The leading cutting surface 54 is of a first predetermined cutting distance 55 from the plane 18. The first predetermined cutting distance 55 corresponds to the desired depth of the plurality of internal threads 46. The first and second cutting surfaces 50, 52 are inclined upwardly with opposing slopes respectively. Having the plurality of teeth 42 with this profile enables the thread cutting insert 10 to resist the stresses from the workpiece 12 and from intermittent stresses. The shape of the plurality of teeth 42 enables a relatively large feeding depth to be made by each of the plurality of teeth 42. The leading cutting surface 54 is generally parallel to the first and second thread removal portions 32, 34. Other application, may require the first or second thread removal portions 32, 34 to be inclined to match the second workpiece (not shown). Other applications may require the fist thread removal portion 32 to have a first thread removal distance 38 which is greater than a second thread removal distance 40 or have the second thread removal portion 34 with the second thread removal distance 40 being greater than the first thread removal distance 38. The first and second thread removal portions 32, 34 are used in combination with the cutting portion 36 to provide the plurality of internal threads 46 without lead-in and exiting threads 56, 58 in the workpiece 12.

Referring to FIG. 3, the thread cutting insert 10 is shown in side plan view. A pair of chip removal surfaces 60 are characterized by a tapered portion 62 and a counterbored surface 64. The threading portion 30 is tapered from the first thread removal distance 38, second thread removal distance 40, and the leading cutting surface 54 of the plurality of teeth 42 to the counterbored surface 64 that is located between the tapered portion 62 and the base 14. Having the thread cutting insert 10 with the pair of chip removal surfaces 60 allows the cutting portion 36 to maximize its cutting by reducing heat that is generated when machining. Heat is conducted away from the cutting portion 36 of the thread cutting insert 10.

Referring to FIG. 4, the workpiece 12 with the insert holder 24 used for holding the thread cutting insert 10 is shown. The insert holder 24 is well known in the art for holding one or more thread cutting inserts 10. The thread cutting insert 10 is fastened to the insert holder 24. The workpiece 12 for thread cutting has a first diameter 66 that allows the fixture to be inserted into the workpiece 12 and corresponds to an internal thread portion 68 of a workpiece receiving bore 70. The internal thread portion 68 is generally equal to desired thread pitch and number of teeth. The workpiece receiving bore 70 includes an undercut portion 72, a counterbored portion 74, and the internal thread portion 68. The undercut portion 72 has a second diameter 76 that is greater than the first diameter 66. The counterbored portion 74 has a third diameter 78 that is greater than the first diameter 66. In one embodiment, workpiece with external threads (not shown) has fluid communicating through the workpiece. The plurality of internal threads 46 are disposed between the counterbored portion 74 and the undercut portion 72 along the internal thread portion 68 of the workpiece receiving bore 70.

INDUSTRIAL APPLICABILITY

With reference to the figures and in operation, plurality of internal threads 46 which may be chipped from the workpiece 12 using conventional methods are eliminated by using this embodiment of the thread cutting insert 10. The thread cutting insert 10 is able to provide the cutting portion 36 necessary for machining plurality of internal threads 46 into the workpiece 12. The ability to machine the plurality of internal threads 46 of uniform thickness and depth allows the workpiece 12 to be heat treated to the proper hardness giving the plurality of internal threads 46 a robustness for securing the workpiece 12.

In operation, the workpiece 12 has the plurality of internal threads 46 machined into the workpiece 12. The workpiece 12 is then heat treated to provide hardened plurality of internal threads 46 that can be securely fastened after many iterations of tightening and loosening which take place over the life of the workpiece 12 without damaging the plurality of internal threads 46.

A method of cutting plurality of internal threads 46 into the workpiece 12. The workpiece 12 is made of cast iron reducing thermal growth differentials and associated stresses. It should be recognized that the method of cutting the plurality of internal threads 46 is suitable for use in applications requiring the first diameter 66 being equal to the second diameter 76 of the undercut portion 72 and the third diameter 78 of the counterbored portion 74 with out departing from the spirit of the invention. Machine the workpiece receiving bore 70 to the first diameter 66, the undercut portion 72 to the second diameter 76, and the counterbored portion 74 to the third diameter 78 in the workpiece 12. Index the thread cutting portion 36 adjacent to the workpiece receiving bore 70. Indexing of the cutting portion 36 requires the insert holder 24 to position the thread cutting portion 36 at least one thread pitch distance into the internal thread portion 68. Begin rotation of the thread cutting insert 10 to a predetermined speed. Once the predetermined speed has been reached, move the thread cutting insert 10 radially into engagement with the internal thread portion 68 to a predetermined distance engaging the first thread removal portion 32 and cutting portion 36 with the internal thread portion 68. The thread cutting insert 10 is then moved axially to cut the plurality of internal threads 46 by continuing engagement of the cutting portion 36 and engaging the second thread removal portion 32 with the internal thread portion 68. The axial movement of the thread cutting insert 10 eliminates the lead-in and exiting threads 56, 58. Cutting the lead-in and exiting threads 56, 58 is accomplished by the first and second thread removal portions 32, 34. The pair of chip removal surfaces 60 allow the thread cutting insert 10 to maximize cutting of the cutting portion 36 while maintaining proper heat rejection which provides durability and long life for the thread cutting insert 10. The thread cutting insert 10 is moved radially out of engagement with the internal thread portion 68 of the workpiece receiving bore 70 allowing the cutting portion 36 to clear the plurality of internal threads 46 of the internal thread portion 68. The thread cutting insert 10 is then removed from the workpiece 12.

The workpiece 12 that utilizes this thread cutting insert 10 provides a greater amount of securing force for applications that require tight fitting joints by providing heat treated, uniform threads to accommodate the required tightening forces. In one embodiment, the counterbored portion 74 is used for passing fluid through the workpiece 12. Using conventional methods which have the lead-in and exiting threads 56, 58 may reduce the securing force of the workpiece 12 since the plurality of internal threads 46 are not of a uniform configuration. Having the lead-in and exiting threads 56, 58 may reduce the securing force in prior applications due to the brittleness of the plurality of internal threads 46 that may fracture and chip off of the workpiece 12 under the securing forces that are applied. The lead-in and exiting threads 56, 58 that are chipped may become lodged between the plurality of internal threads 46 and the workpiece 12. Chipped pieces may cause the workpiece 12 to be misaligned adding stresses and possibly fluid leakage. Another example of possible damage is having the lead-in and exiting threads 56, 58 break off and pass through the workpiece 12 with the fluid becoming lodged in tips of fuel injectors causing improper combustion. Another example of possible damage is having chipped the plurality of internal threads 46 scratching components that require smooth surfaces for functionality.

We claim:

1. A thread cutting insert for connection to a insert holder, comprising:

a base having a fastener receiving bore defined by a cylindrical surface and a longitudinal axis, and said base having an edge defining a plane; and a threading portion having a first thread removal portion, a second thread removal portion, and a cutting portion located intermediate said first and second thread removal portions separating said first and second thread removal portions, said cutting portion having a plurality of teeth each having a leading cutting surface spaced a first predetermined cutting distance from said plane, a first cutting surface, and a second cutting surface, said leading cutting surface of each of said plurality of teeth being generally parallel to each other, said first and second cutting surfaces being inclined upwardly and having opposing slopes.

2. The thread cutting insert of claim 1 wherein said plurality of teeth being evenly spaced.

3. The thread cutting insert of claim 1 wherein said first thread removal portion being spaced a second distance from said plane and said second thread removal portion being spaced a third distance from said plane.

4. The thread cutting insert of claim 3 wherein said second and third distances being equal.

5. The thread cutting insert of claim 3 wherein said second distance being greater than said third distance.

6. The thread cutting insert of claim 3 wherein said third distance being greater than said second distance.

7. The thread cutting insert of claim 1 wherein said first, second, and third distances being equal.

8. The thread cutting insert of claim 1 wherein said first thread removal portion being inclined and said second thread removal portion being parallel to said leading cutting surface.

9. The thread cutting insert of claim 1 wherein said threading portion having a pair of opposed chip removing surfaces.

10. The thread cutting insert of claim 9 wherein said pair of chip removal surfaces having a tapered portion and curved intersecting the tapered portion.

11. The thread cutting insert of claim 1 wherein said second thread removal portion being inclined and said first thread removal portion being parallel to said leading cutting surface.

12. The thread cutting insert of claim 1 wherein said first and second thread removal portions being inclined.

13. A method of milling threads in a workpiece having a workpiece receiving bore, said workpiece receiving bore defined by an undercut portion, a counterbore portion, and an internal thread portion located intermediate said counterbore and undercut portions, a thread cutting insert being adapted for use with said workpiece, said thread cutting insert having a threading portion, a first thread removal portion for eliminating a lead-in thread, and a second thread removal portion for eliminating an exiting thread, a cutting portion having a plurality of teeth for cutting a plurality of internal threads, the method comprising the steps of:

machining said workpiece receiving bore to a first diameter corresponding to said internal thread portion;

machining said undercut portion in said workpiece receiving bore to a second diameter being greater than said first diameter of said workpiece receiving bore;

machining said counterbored portion in said workpiece receiving bore to a third diameter being greater than said first diameter of said workpiece receiving bore;

indexing said thread cutting insert adjacent said internal thread portion of said workpiece receiving bore;

rotating said thread cutting insert at a predetermined speed;

moving said thread cutting insert into engagement with said internal thread portion to a predetermined distance and engaging said first thread removal and cutting portions with said internal thread portion;

moving said thread cutting insert axially continuing engagement of said cutting portion and engaging said second thread removal portion with said internal thread portion thereby minimizing said lead-in and exiting threads; and moving said thread cutting insert radially out of engagement with said internal thread portion of said workpiece receiving bore, said cutting portion having said plurality of teeth clearing said plurality of internal threads of said internal thread portion.

14. The method of milling threads as in claim 13, wherein said indexing has said second thread removal portion being adjacent said counterbored portion.

15. The method of milling threads as in claim 13, wherein said plurality internal threads are less than said plurality of teeth.

* * * * *